United States Patent
Naito et al.

(10) Patent No.: US 9,190,936 B2
(45) Date of Patent: Nov. 17, 2015

(54) MICRO-ELECTROMECHANICAL GENERATOR AND ELECTRIC APPARATUS USING SAME

(75) Inventors: Yasuyuki Naito, Osaka (JP); Rob Van Schaijk, Eindhoven (NL); Martijn Goedbloed, Aachen (DE); Christine De Nooijer, Geldrop (NL); Dennis Hohlfeld, Veldhoven (NL); Geert Altena, Eindhoven (NL)

(73) Assignees: PANASONIC CORPORATION, Osaka (JP); STICHTING IMEC NEDERLAND, Eindhoven (NL)

( * ) Notice: Subject to any disclaimer, the term of this patent is extended or adjusted under 35 U.S.C. 154(b) by 269 days.

(21) Appl. No.: 13/703,151

(22) PCT Filed: Jul. 4, 2011

(86) PCT No.: PCT/JP2011/003806
§ 371 (c)(1),
(2), (4) Date: Dec. 10, 2012

(87) PCT Pub. No.: WO2012/008113
PCT Pub. Date: Jan. 19, 2012

(65) Prior Publication Data
US 2013/0076202 A1 Mar. 28, 2013

(30) Foreign Application Priority Data
Jul. 16, 2010 (JP) .................. 2010-162137

(51) Int. Cl.
*H02N 1/00* (2006.01)
*H02N 1/04* (2006.01)
*H02N 1/08* (2006.01)

(52) U.S. Cl.
CPC ................ *H02N 1/00* (2013.01); *H02N 1/002* (2013.01); *H02N 1/04* (2013.01); *H02N 1/08* (2013.01)

(58) Field of Classification Search
CPC ............ H02N 1/002; H02N 1/08; H02N 1/04; H02N 1/00
USPC ........................ 310/300, 310, 309, 308, 12.03
See application file for complete search history.

(56) References Cited

U.S. PATENT DOCUMENTS 8,102,097 B2 * 1/2012 Naruse et al. .................. 310/309
8,212,450 B2 * 7/2012 Mabuchi et al. ............... 310/309
(Continued)

FOREIGN PATENT DOCUMENTS

JP 2007-312551 11/2007
JP 2009-11149 1/2009
(Continued)

OTHER PUBLICATIONS
International Search Report issued Aug. 9, 2011 in International (PCT) Application No. PCT/JP2011/003806.

*Primary Examiner* — Terrance Kenerly
*Assistant Examiner* — Alexander Singh
(74) *Attorney, Agent, or Firm* — Wenderoth, Lind & Ponack, L.L.P.

(57) ABSTRACT

Disclosed is a highly reliable inductive vibration power generator wherein mechanical damping caused by the phenomenon of electrostatic pulling-in (stiction) and the like is suppressed even if the potential of an electret is increased and/or the gap between an electrode and the electret is reduced in order to increase the amount of power generation. The two surfaces of a movable substrate are respectively provided with first electrets and second electrets. By means of providing first electrodes and second electrodes to a lower substrate and an upper substrate and facing the respective electrets with a predetermined gap therebetween, electrostatic force is caused to arise on both sides of the movable substrate, and the pulling of the movable substrate in only one direction is prevented.

5 Claims, 14 Drawing Sheets

(56) References Cited

U.S. PATENT DOCUMENTS

| | | | |
|---|---|---|---|
| 8,564,169 B2* | 10/2013 | Sano | 310/309 |
| 2008/0296984 A1 | 12/2008 | Honma et al. | |
| 2010/0072855 A1* | 3/2010 | Matsubara et al. | 310/300 |
| 2011/0266915 A1 | 11/2011 | Matsubara et al. | |
| 2013/0076275 A1* | 3/2013 | Cohen et al. | 318/116 |
| 2013/0099626 A1* | 4/2013 | Takeuchi et al. | 310/300 |
| 2013/0241346 A1* | 9/2013 | Boisseau et al. | 310/300 |

FOREIGN PATENT DOCUMENTS

| | | |
|---|---|---|
| JP | 2010-68643 | 3/2010 |
| JP | 2010-81724 | 4/2010 |
| WO | 2009/054251 | 4/2009 |

* cited by examiner (a)

(b)

(a)

(b)

(a)

(b)

(a)

(b)

(c)

MICRO-ELECTROMECHANICAL GENERATOR AND ELECTRIC APPARATUS USING SAME

TECHNICAL FIELD

The present invention relates to a micro-electro-mechanical power generator, and an electrical equipment using the same.

BACKGROUND OF THE INVENTION

Micro electro mechanical systems (hereinafter may be sometimes abbreviated to "MEMS") is applicable to various fields such as a wireless communication field, an optical engineering field, an acceleration sensor field, a bioscience field, and power engineering field. In the power engineering field among the above described fields, a device manufactured based on the MEMS, i.e., an Energy Harvester for collecting and utilizing energy from light, heat, and vibration which are dissipated in environment, has been developed. The Energy Harvester is applied to a power supply of a low-power radio to thereby realize a wireless sensor network which requires no power supply cables and batteries. Application of the MEMS technology to the Energy Harvester enables down-sizing of the Energy Harvester.

In environment where less light and heat can be generated, a vibration power generator is useful since such power generator can generate electric power by utilizing vibration which is generated by members composing an element when force is applied to the members from outside environment. The vibration power generator is divided into a piezoelectric-type vibration power generator, an electromagnetic-type vibration power generator, and an electrostatic-type vibration power generator. The electrostatic-type vibration power generator has an advantage that it requires no piezoelectric material and no magnetic material and thus can be manufactured with a simple manufacturing method.

The electrostatic type vibration power generator is equipped with electrodes facing to electrically charged electrets and is configured such that, when a weight is vibrated due to force applied from the outside environment, a facing area in which the electrets face to the electrodes varies. The electrostatic type vibration power generator is the Energy Harvester which realizes electric power generation by electric power supply and electric power discharge to the electrodes in such a manner that a variation of an electrostatic capacity occurring according to the variation of the facing area is utilized to repetitively generate the maximum value and the minimum value of the electrostatic capacity. Various electrostatic-type vibration power generators have been proposed to date.

PRIOR ART DOCUMENT

Patent Document

Patent Document 1: JP-A-2007-312551

DISCLOSURE OF THE INVENTION

Problems to be Solved by the Invention

In order to increase the electric power generation of an electrostatic-type vibration power generator, required are to increase an electric power supply upon maximum capacity and to increase a capacity variation ratio between the maximum value and the minimum value of the electrostatic capacity. The above described requirements can be satisfied by increasing a potential of the electrets and/or by narrowing a gap between electrodes and electrets. With the above described method, however, an electrostatic force generated between the electrodes and the electrets becomes larger, so that mechanical damping due to a pull-in effect, i.e., stiction, tends to occur. As a result thereof, vibration of a weight and driving of the power generator are inhibited, thereby inviting a problem of drop-off in performance of the power generator and reliability thereof.

Problems raised in the conventional electrostatic-type vibration power generator will be described in detail below.

FIG. 12 is a cross sectional view of the conventional micro-electro-mechanical power generator illustrating a configuration of an electrostatic vibration power generator. A mechanism how to generate the electric power by the power generator will be described below.

A micro-electro-mechanical power generator 1000 is equipped with a lower substrate 111, lower electrodes 102, a pad 105 for routing wires from the power generator, fixation structures 108, a movable substrate 110, lower electrets 101, springs 201, and lower junctions 106. The power generator 1000 further includes an upper substrate 109 and upper junctions 107 for protecting the movable substrate 110 and the springs 201.

Generally, the fixation structures 108, the springs 201, and the movable substrate 110 are formed by processing one single substrate. The fixation structures 108 are sometimes referred to as fixation portions and the movable substrate is sometimes referred to as a movable portion or a weight. In the power generator 1000, the movable substrate (i.e., weight) 110 is vibrated following vibration of the outside environment. A spring constant and a resonance frequency of the springs 201 are optimized such that the maximum amplitude can be generated in a vibration frequency of the outside environment. The vibration of the movable substrate 110 causes change of overlapping between the lower electrodes 102 and the lower electrets 101 when viewed in a direction vertical to a surface of the movable substrate, whereby a state in which the facing area is largest or a state in which the facing area is smallest occur repeatedly.

In the state that the facing area is the largest area, an electrostatic capacity value between the substrate 111 and the movable substrate 110 becomes the maximum value. A higher potential is set to the electrically charged lower electrets 101, so that an electric charge is charged to the lower electrodes 102. On the other hand, in a state that the facing area is the smallest area, the electrostatic capacity value between the substrate 111 and the movable substrate 110 becomes the minimum value and thus the electric charge charged to the lower electrodes 102 is released from the restriction thereof. Thus released electric charge is output from, for example, the pad 105, as the electric power.

In the power generator 1000 with the above described configuration, in order to increase the generation of the electric power, required is to increase an electric power supply upon the maximum capacity and to increase a capacity variation ratio between the maximum value and the minimum value of the electrostatic capacity. How to realize the above requests is, as described above, to increase the electric potential of the lower electrets 101 and/or to narrow a gap between the lower electrodes 102 and the lower electrets 101. FIG. 13 illustrates a simulation result indicating a relationship of a distance between the electrodes and the electrets to the electrostatic capacity change ratio. As illustrated in the drawing, the electrostatic capacity change ratio can be increased by narrowing the gap between the lower electrodes 102 and the lower electrets 101.

On the other hand, when the gap is narrowed, the electrostatic force generating between the lower electrodes 102 and the lower electrets 101 increases more, so that the mechanical damping due to the pull-in phenomenon (i.e., stiction) occurs. As a result thereof, as described above, the vibration of the movable substrate 110 and the driving of the power generator are inhibited.

Patent Document 1 discloses an example of a method for keeping the gap between electrodes and electrets to an appropriate distance. An electrostatic type vibration power generator as disclosed in Patent Document 1 has such a configuration that an area at which the electrets and the electrets are opposed to each other is formed in addition to an area at which electrets and electrodes are opposed to each other and the opposed electrets are electrically charged to the same pole. The electrets electrically charged to the same pole decrease a pull-in force caused by electrostatic attraction by an electrostatic repulsive force. However, the power generator as disclosed in the Patent Document 1 has such a configuration that both of the electrets for supplying the electric power and the electrets for generating the repulsive force are formed on the same plane of a minute weight (i.e., movable substrate). Therefore, the electric field generated from the electrets becomes a complicated form, resulting in making it hard to control thereof.

The present invention has been made in order to solve the above described problems, and an object of the present invention is to provide an electrostatic type vibration power generator in which increase of the generation of the electric power and improvement of the reliability are achieved as the micro-electro-mechanical power generator.

Means for Solving the Problems

To solve the above problems, the present invention provides a micro-electro-mechanical power generator including:
a first substrate having a first substrate surface;
a second substrate having a second substrate surface;
a movable substrate which can move; and
fixation structures for supporting the movable substrate;
wherein the first substrate surface and the second substrate surface are opposed to each other;
wherein the movable substrate is disposed between the first substrate and the second substrate and can move at least in one axis direction that is in parallel with the first substrate surface (hereinafter, the direction is also referred to as a "moving direction of the movable substrate");
wherein a plurality of first electrets are disposed on one surface of the first substrate surface and a surface of the movable substrate facing to the first substrate surface and a plurality of first electrodes are disposed on the other surface; and
wherein a plurality of second electrets are disposed on one surface of the second substrate surface and the surface of the movable substrate facing to the second substrate surface and a plurality of second electrodes are disposed on the other surface.

According to an aspect of the present invention, the micro-electro-mechanical power generator (also simply referred to as a "power generator") is configured to generate electrostatic force between the first substrate and the movable substrate as well as to generate electrostatic force also between the second substrate and the movable substrate. With the above configuration, the electrostatic force is generated on both surfaces of the movable substrate, so that the electrostatic force generating on one surface side can decrease the pull-in force generated by the electrostatic force generating on the other surface side.

In the power generator of the present invention, the movable substrate is preferably connected to a fixation substrate via elastic structures. In other words, the movable substrate is preferably supported by the fixation structures via the elastic structures. The above described configuration enables stable movement (i.e., stable vibration) of the movable substrate.

In the power generator of the present invention, electric power can be output from the first electrodes and the second electrodes. In this case, the generation of the electric power can be increased. More specifically, the facing area between the electrodes and the electrets can be increased by laminating the facing areas. That is, without increasing an installation area, the electric power generation corresponding to that of two power generators can be generated in one power generator.

The micro-electro-mechanical power generator of the present invention may have a configuration that the first electrets, the first electrodes, the second electrets, and the second electrodes are disposed such that, when positions of the first electrets align with positions of the first electrodes when viewed in a direction vertical to the first substrate surface, positions of the second electrets are shifted from positions of the second electrodes by a predetermined distance in the moving direction of the movable substrate.

When the first electrets, the first electrodes, the second electrets, and the second electrodes are positioned on the same straight line in a direction vertical to a first substrate surface, the two reversing forces affect on the movable substrate in a direction in parallel to the direction vertical to the first substrate surface, whereby movement of the movable substrate may be restricted. For this reason, the second electrets and the second electrodes are disposed such that the first electrets and the second electrets and the first electrodes and the second electrodes are disposed such that they are not aligned on the same straight line and the second electrets and the second electrodes are shifted by a predetermined distance from the first electrets and the first electrodes. A phenomenon to inhibit the vibration of the movable substrate due to the restriction of the movable substrate can be thereby avoided.

When the second electrodes are disposed so as to be shifted from the second electrets, the electrostatic force generated between the second electrodes and the second electrets is applied obliquely with respect to the surface of the movable substrate. In other words, not only the electrostatic force in a direction vertical to the movable substrate surface but also an electrostatic force in a direction parallel with the movable substrate surface (i.e., moving direction) can be applied to the movable substrate. Such an electrostatic force enables or accelerates displacement of the movable substrate.

In the power generator with the above described configuration, for example,
the first electrets are disposed such that they are parallel with each other and distances between centers of two adjacent first electrets are equal to each other;
the first electrodes are disposed such that they are parallel with each other and distances between centers of two adjacent first electrodes are equal to each other;
the second electrets are disposed such that they are parallel with each other and distances between centers of two adjacent second electrets are equal to each other;
the second electrodes are disposed such that they are parallel with each other and distances between centers of two adjacent electrodes are equal to each other;

the distances between centers of the two adjacent first electrets, the distances between centers of the two adjacent first electrodes, the distances between centers of the two adjacent second electrets, and the distances between centers of the two adjacent second electrodes are equal to each other;

the first electrets, the first electrodes, the second electrets, and the second electrodes line up in a direction in parallel with the moving direction of the movable substrate; and the predetermined distance is about a half distance of the distance between centers of the two adjacent first electrodes.

The power generator of the present invention may be configured such that the first electrets and the second electrets are disposed, respectively, on two different substrate surfaces selected from the surfaces of the first substrate, the movable substrate, and the second substrate. In the power generator of this configuration, two electrets are formed on the different substrate surfaces, respectively, so that an electrically charging process can be performed for each of two electrets separately during a manufacturing process of the power generator, resulting in simplification of a manufacturing process thereof.

Effects of the Invention

In the power generator of the present invention, the vibration of the movable substrate is not inhibited by the electrostatic force even when the generation of the electric power is increased by increasing the electric potential of the electrets and/or by narrowing a gap between the electrets and the electrodes. The present invention can realize the micro-electro-mechanical power generator in which generation of the electric power is increased as well as reliability thereof is improved, and electric equipment using the same.

MODE FOR CARRYING OUT THE INVENTION

Embodiments of the present invention will be described below with reference to the accompanying drawings.

First Embodiment

Figure 1:
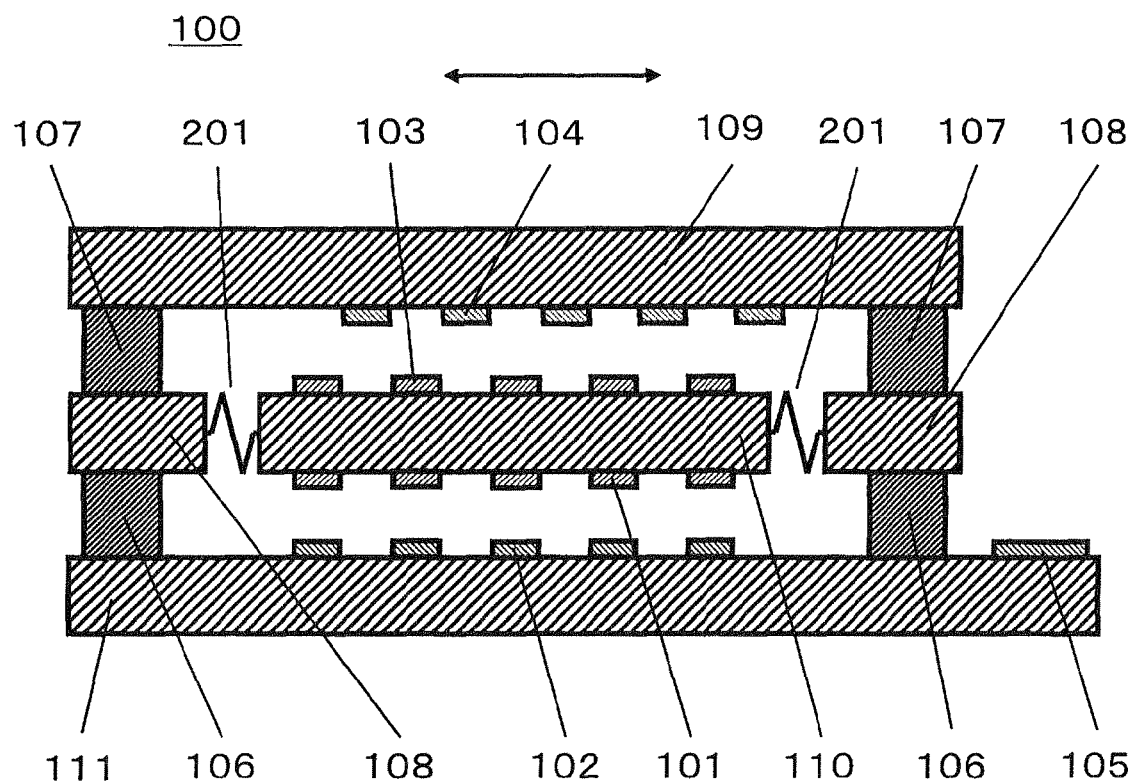
FIG. 1 is a cross sectional view illustrating a configuration of a micro-electro-mechanical power generator in a first embodiment of the present invention.
Figure 2:
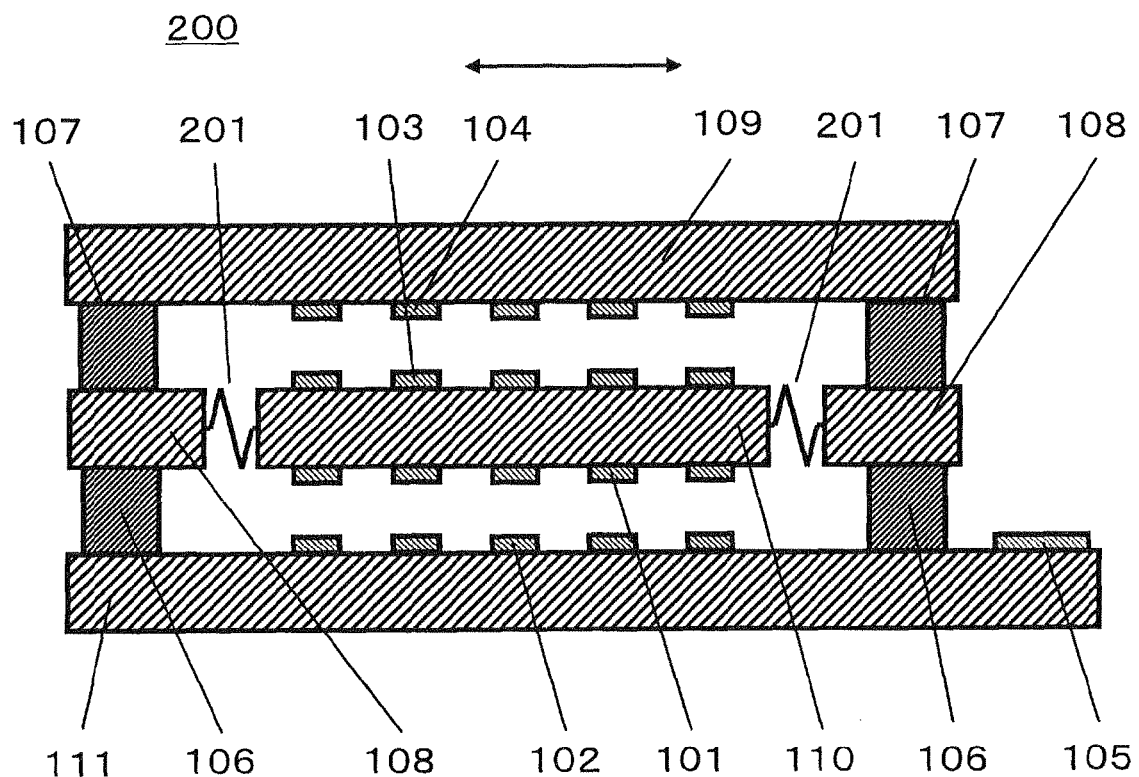
FIG. 2 is a cross sectional view illustrating another configuration of the micro-electro-mechanical power generator in the first embodiment of the present invention.

FIG. 1 and FIG. 2 are cross sectional views illustrating configurations of a micro-electro-mechanical power generator in the present embodiment, respectively. Each of the micro-electro-mechanical power generators 100 and 200 as illustrated in FIGS. 1 and 2 is equipped with a lower substrate 111 as a first substrate, an upper substrate 109 as a second substrate, a movable substrate 110, springs 201 as elastic structures, and fixation structures 108. In FIG. 1, an upper surface of the lower substrate 111 faces to a lower surface of the upper substrate 109. Therefore, in the power generator 100, the upper surface of the lower substrate 111 and the lower surface of the upper substrate 109, respectively, correspond to a first substrate surface and a second substrate surface.

Figure 12:
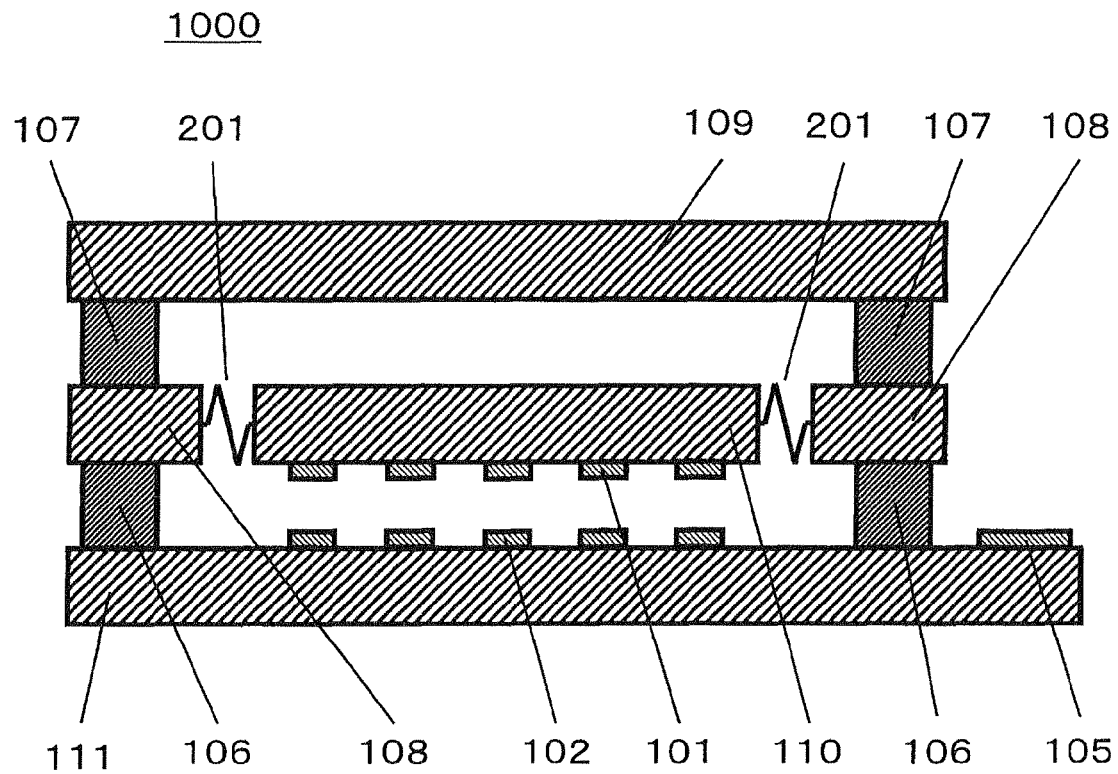
FIG. 12 is a cross sectional view illustrating a configuration of the conventional micro-electro-mechanical power generator.
Figure 13:
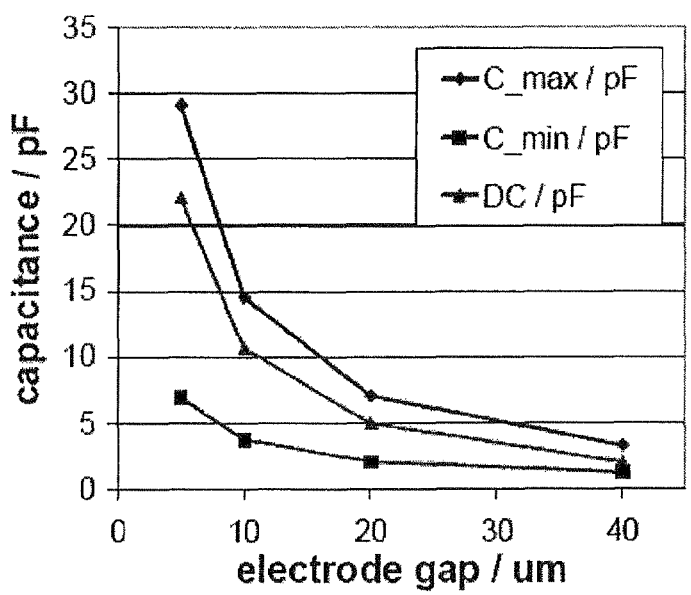
FIG. 13 is a graph illustrating a relationship of a distance between electrodes and electrets to a capacity change ratio in the conventional micro-electro-mechanical power generator.

The first substrate surface (i.e., upper surface) of the lower substrate 111 is provided with a plurality of first electrodes 102 and a pad 105 formed thereon for routing a wire from elements (e.g., the first electrodes 102, the lower substrate 111, or the other elements) composing the power generator 100. The second substrate surface (i.e., lower surface) of the upper substrate 109 is provided with a plurality of second electrodes 104 formed thereon. As described above with reference to FIG. 12, the fixation structures 108, the movable substrate 110, and the springs 201 are generally formed by processing one single substrate. Accordingly, these members may be collectively referred to as "middle substrate 108 in which the movable substrate (or the movable portion or the weight) 110 is connected via the elastic structures 201" or "middle substrate 108 having the weight 110 movable owing to the elastic structures 201".

The movable substrate 110 vibrates (i.e., reciprocates) in at least a one axis direction (i.e., in a direction illustrated by a double-headed arrow), the direction being in parallel with a surface facing to the upper substrate 109 and the lower substrate 111 (i.e., the first substrate surface and the second substrate surface), following external vibration. The movable substrate surface facing to the first substrate surface is provided with the first electrets 101 formed thereon, the first electrets 101 generating an electric field above the movable substrate 110 and facing to the first electrodes 102. The movable substrate surface facing to the second substrate surface is provided with the second electrets 103 formed thereon, the second electrets 103 generating an electric field beneath the movable substrate and facing to the second electrodes 104.

Figure 14:
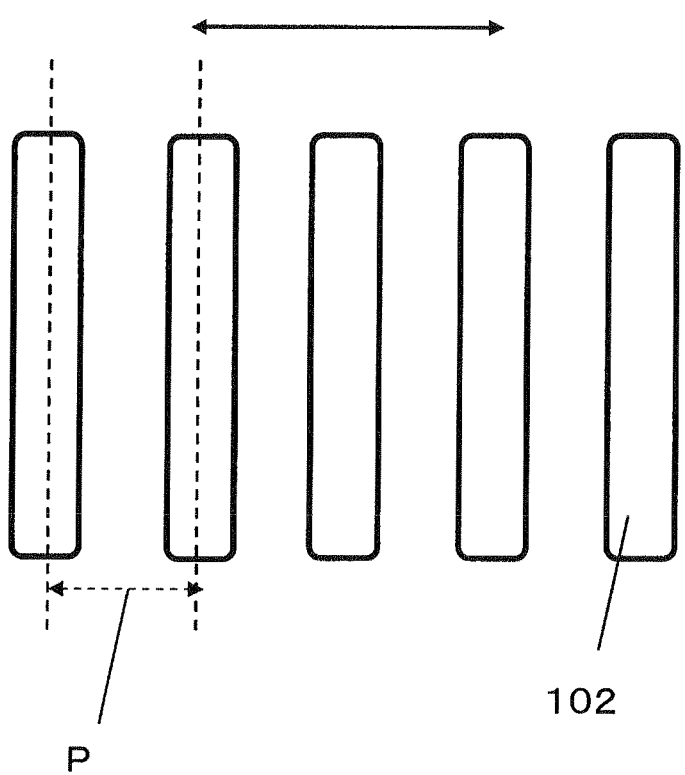
FIG. 14 is a plane view illustrating a layout of the first electrodes in the micro-electro-mechanical power generator in the first embodiment of the present invention.

In the illustrated embodiment, the first electrodes 102 are parallel to each other and disposed such that distances between centers of two adjacent first electrodes 102 are equal. The first electrodes 102 are provided at regular intervals. The first electrodes 102 are arranged side by side in a direction in parallel with the moving direction of the movable substrate 110. In other words, the first electrodes 102 are disposed in a manner as illustrated in FIG. 14 when viewed in a direction vertical to the first substrate surface. The first electrets 101, the second electrets 103, and the second electrodes 104 are also disposed in a similar manner.

In the power generator 100 as illustrated in FIG. 1, the first electrodes 102, the first electrets 101, and the second electrets 103 are aligned when viewed in a direction vertical to the first substrate surface. The second electrodes 104 are disposed such that they are shifted from the first electrodes 102, the first electrets 101, and the second electrets 103. In the power generator 200 as illustrated in FIG. 2, the first electrodes 102, the first electrets 101, the second electrets 103, and the second electrodes 104 are aligned when viewed in a direction vertical to the first substrate surface.

The lower substrate 111 and the fixation structures 108 are joined via the lower junctions 106 such that a predetermined gap is formed between the first electrodes 102 and the first electrets 101. Similarly, the upper substrate 109 and the fixation structures 108 are joined via the upper junctions 107 such that a predetermined gap is formed between the second electrodes 104 and the second electrets 103.

In the power generators 100 and 200 with the above described configuration, the electrodes and the electrets are provided not only on and below the movable substrate 110 but also on and above the movable substrate 110. With this configuration, an electrostatic force can be generated between the second electrodes 104 and the second electrets 103, pulling up the movable substrate 110 which is downwardly pulled in due to the electrostatic force generated between the first electrodes 102 and the first electrets 101, and preventing the movable substrate 110 from being pulled in a one direction (i.e., in a downward direction in FIGS. 1 and 2).

Preferably, as illustrated in FIG. 1, the second electrodes 104 are disposed so as to be shifted from positions of the second electrets 103, the first electrets 101, and the first electrodes 102 in the moving direction of the movable substrate 110. In FIG. 1, the first electrodes 102, the first electrets 101, and the second electrets 103 are disposed in a straight line when viewed in a direction vertical to the first substrate surface. More specifically, the first electrodes 102, the first electrets 101, and the second electrets 103 are positioned in the same straight line vertical to the first substrate surface and thus are overlapped one another in the illustrated embodiment. On the other hand, the second electrodes 104 are disposed so as to be shifted from the second electrets 103 (i.e., from the first electrodes 102 and the first electrets 101) by a half distance of the distance between centers of the first electrodes 102 in a direction parallel with the moving direction of the movable substrate. The distance between centers means here a distance between center lines passing through a center in a width direction of the first electrodes 102 (i.e., a direction in parallel with the moving direction of the movable substrate). The distance corresponds to a distance indicated by P in FIG. 14.

In the illustrated embodiment, widths (i.e., sizes in parallel with the moving direction of the movable substrate) of the two electrets and two electrodes are identical to each other. For example, in a case where the width of the first electrets differs from the width of the first electrodes, a state that the first electrets and the first electrodes are in the same straight line when viewed in a direction vertical to the first substrate surface means that center lines passing through centers of the width direction of the first electrets coincide with the center lines passing through centers of the width direction of the first electrodes.

With this configuration, the first electrodes 102, the first electrets 101, the second electrodes 104, and the second electrets 103 can be prevented from being positioned in the same straight line in the direction vertical to the first substrate surface during the vibration of the movable substrate 110. More specifically, when an overlapped area between the first electrodes 102 and the first electrets 101 becomes largest, the second electrodes 104 and the second electrets 103 do not overlap. Accordingly, the movable substrate 110 can be prevented from being applied with a mutually reverse electrostatic force in a direction vertical to the movable substrate surface. As a result thereof, a phenomenon wherein the vibration of the movable substrate 110 is inhibited by the restriction of the movable substrate can be avoided.

Since the second electrodes 104 are disposed so as to be shifted from the second electrets 103 by about a half the distance between centers of the first electrodes 102 in the moving direction of the movable substrate 110, an oblique electrostatic force is applied between one second electret 103 and two second electrodes 104. Accordingly, not only the electrostatic force in a direction vertical to the surface of the movable substrate 110 but also an electrostatic force in a direction parallel with the surface can be applied to the movable substrate 110. The electrostatic force applied in the above described direction enables to start displacement of the movable substrate 110 and to accelerate keeping of the displacement (i.e., vibration of the movable substrate).

An effect of keeping the displacement of the movable substrate 110 will be described below with reference to FIGS. 15 and 16.

Figure 15:
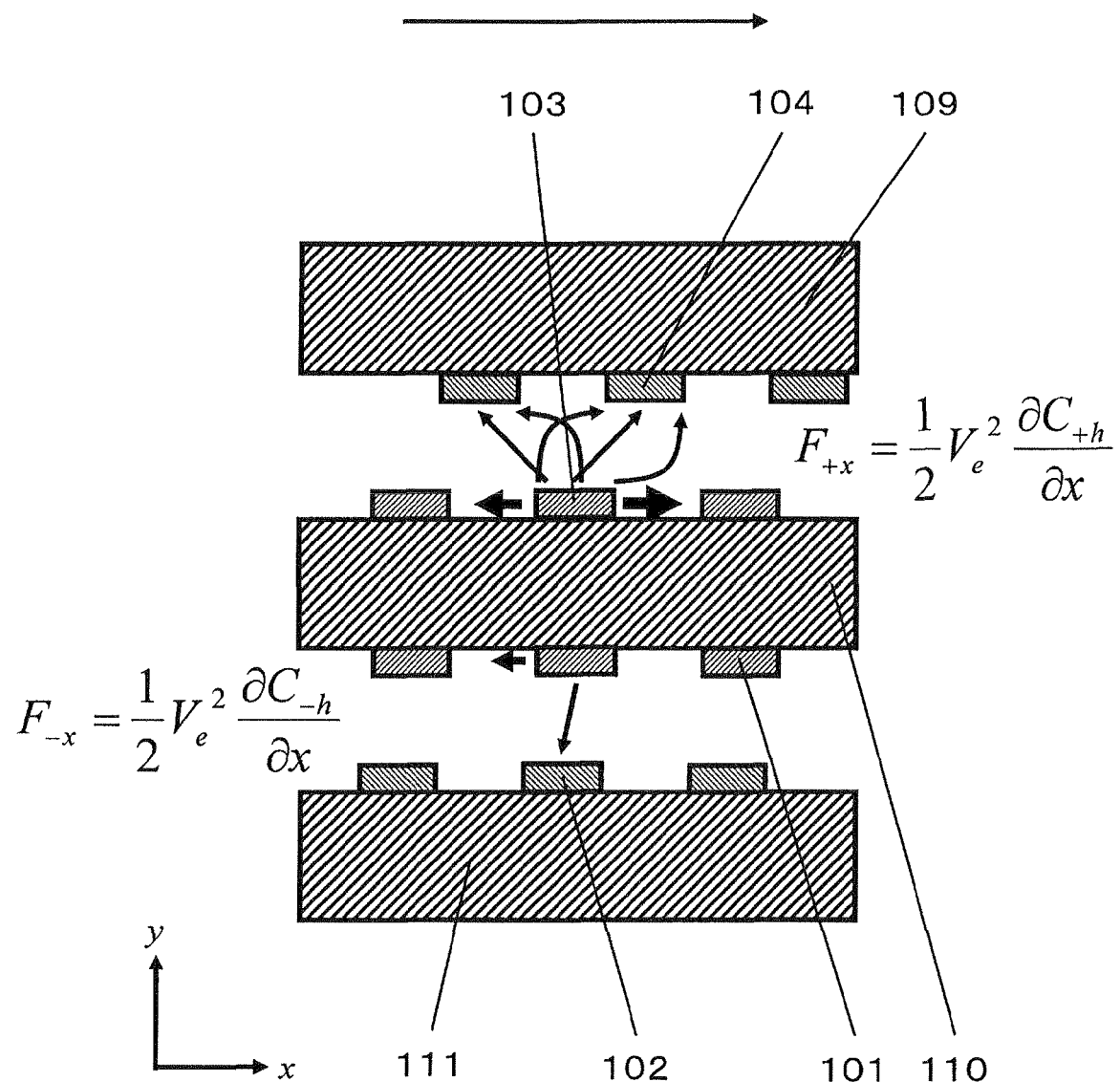
FIG. 15 is a cross sectional view enlarging an area in the vicinity of the electrets and the electrodes of the power generator illustrated in FIG. 1.

FIG. 15 is an enlarged view illustrating an area in the vicinity of the electrets and electrodes of the power generator illustrated in FIG. 1. FIG. 15 illustrates a mechanism for generating the electrostatic force in a direction in parallel with the surface of the movable substrate 110. FIG. 16 is an enlarged view illustrating an area in the vicinity of the electrets and the electrodes of the power generator illustrated in FIG. 2. Both of FIGS. 15 and 16 illustrate a state that the movable substrate 110 is shifted to an arrow direction (i.e., +x direction) illustrated therein and the second electrets 103 start coming up to the second electrodes 104.

Figure 16:
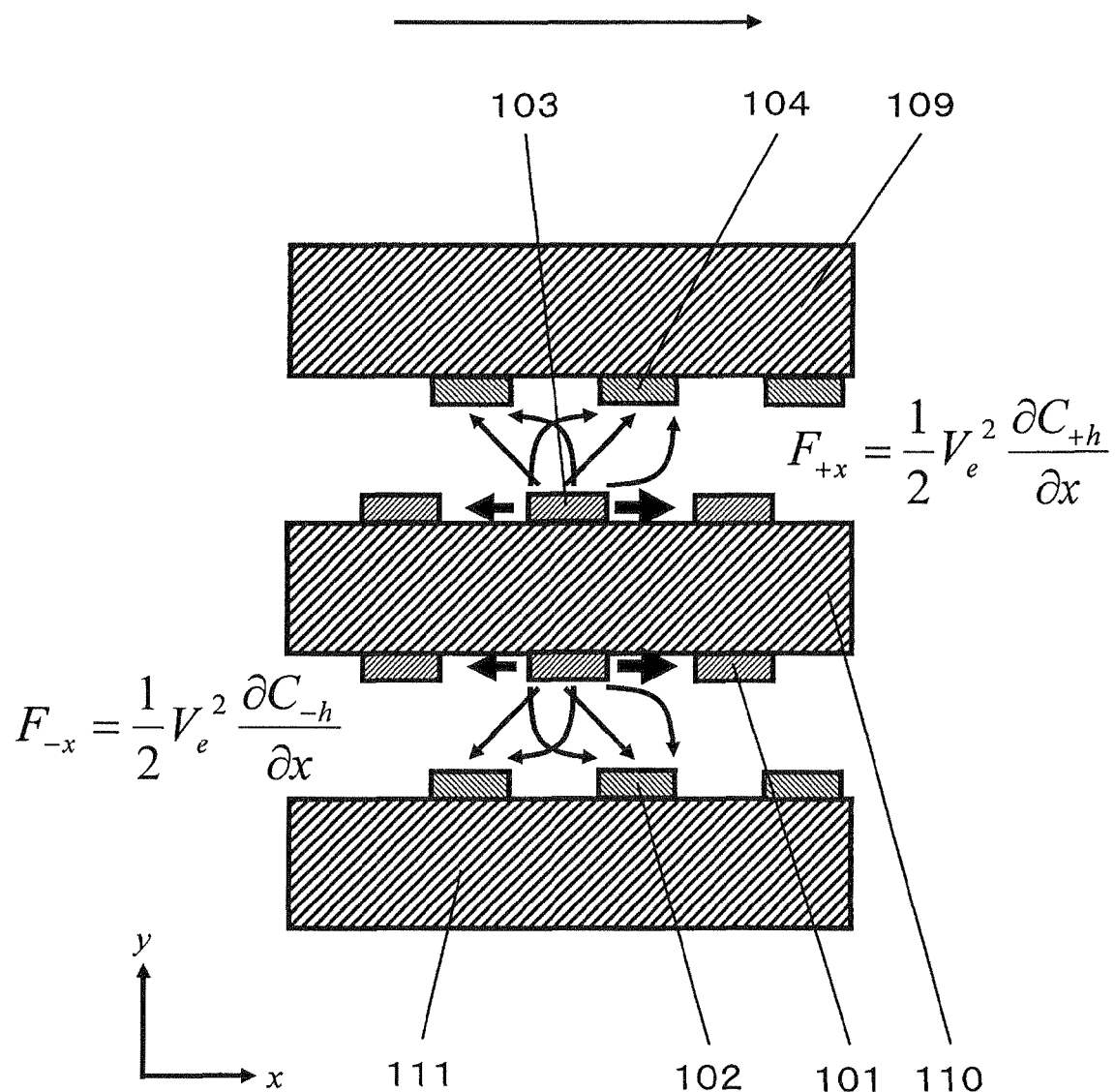
FIG. 16 is a cross sectional view enlarging an area in the vicinity of the electrets and the electrodes of the power generator illustrated in FIG. 2.

In FIG. 16, the first electrodes 102 and the second electrodes 104 are disposed so as to be in a straight line when viewed in a direction vertical to the first substrate surface, so that the first electrets 101 also start coming up to the first electrodes 102. An electrostatic force $F_{-x}$ in a direction reverse to a traveling direction of the movable substrate 110 (i.e., −x direction) is applied between the first electrets 101 and the first electrodes 102 and between the second electrets 103 and the second electrodes 104, and a value of the electrostatic force $F_{-x}$ is proportional to the following variation of an electrostatic capacity $C_{-h}$, between the electrets and the electrodes, which accompanies the displacement of the movable substrate 110:

$$(\partial C_{-h}/\partial x) \qquad \text{[Equation 1]}$$

and is expressed by the following equation:

$$F^{-x} = (1/2)V_e^2(\partial C_{-h}/\partial x) \qquad \text{[Equation 2]}$$

Similarly, an electrostatic force $F_{+x}$ is applied between the first electrets 101 and the first electrodes 102 and between the second electrets 103 and the second electrodes 104 in the traveling direction (i.e., +x direction) of the movable substrate 110, which is expressed by the following equation:

$$F_{+x} = (1/2) V_e^2 (\partial C_{+h} / \partial x) \quad \text{[Equation 3]}$$

In the above equation, $V_e$ denotes an electric potential of the electrets. Therefore, the sum of the electrostatic force $F_{+x}$ and the electrostatic force $F_{-x}$ is applied to the movable substrate 110.

For example, in a state that the electrets start coming up to the electrodes, increase of the facing area and increase of a fringing electric field make the electrostatic force $F_{+x}$ in the traveling direction (i.e., x direction) of the movable substrate 110 larger. On the other hand, the electrostatic force $F_{-x}$ generated between the first electrets 101 and the first electrodes 102 and between the second electrets 103 and the second electrodes 104 in the direction reverse to the traveling direction of the movable substrate 110 (i.e., -x direction) decreases. To the contrary, in a state that the electrets start coming away from the electrodes, the electrostatic force $F_{+x}$ decreases, whereas the electrostatic force $F_{-x}$ increases. As described above, the movable substrate 110 is always applied with a force in the traveling direction thereof or a force in the direction reverse to the traveling direction thereof. Therefore, a large force is required to keep the displacement.

As it is illustrated in FIG. 15, when the second electrets 103 are disposed so as to be shifted by about a half the distance between centers of the first electrodes 102 and the second electrets 103 start coming up to the second electrodes 104, the first electrets 101 start coming away from the first electrodes 102. In this case, the electrostatic force $F_{+x}$ increases, whereas the electrostatic force $F_{-x}$ decreases. In other words, with the configuration as illustrated in FIG. 1, the maximum value of the electrostatic force applied to the movable substrate 110 can be decreased and the displacement of the movable substrate 110 can be kept even within the smaller acceleration area.

As illustrated in the drawing, the maximum value of the electrostatic force can be decreased if any shift is observed between positions of the first electrodes 102 on the upper substrate and the second electrodes 104 on the lower substrate when viewed in a direction vertical to the first substrate surface, in a case where the electrets 101 and the electrets 103 disposed on the movable substrate 110 are positioned in a straight line when viewed in a direction vertical to the first substrate surface. As a result thereof, the power generator can be operated even in a low acceleration area. However, to maximize the effect of shifting the positions of the first electrodes from the positions of the second electrodes, as illustrated in FIG. 1, it is effective to shift the second electrodes by about a half the distance between centers of the first electrodes. The shifting of about the half distance enables to minimize the sum of the electrostatic force $F_{+x}$ and the electrostatic force $F_{-x}$ which effect on the movable substrate 110.

In the vibration power generator 100 illustrated in FIG. 1, the width of the first electrets 101 and the width of the first electrodes 102 are almost equal to each other and the distance between centers of the first electrets 101 and the distance between centers of the first electrodes 102 are about twice as the width. Therefore, any of the portions of the first electrets 101 might not overlap the portions of the first electrodes 102 (i.e., a state that both of them do not overlap each other occurs) during the vibration. Similarly, any of the portions of the second electrets 103 might not overlap the portions of the second electrodes 104 (i.e., a state that both of them do not overlap each other occurs) during the vibration. If the electrets and the electrodes always overlap each other during the vibration, a pretty large electrostatic force is always applied to the movable substrate 110 in a direction reverse to the traveling direction of the movable substrate 110 and thus the movement of the movable substrate 110 is inhibited. If there is a state that the electrets and the electrodes do not overlap each other during the vibration, the movement of the movable substrate 110 is not inhibited but the movable substrate 110 can effectively vibrate to enable the generation of the electric power to be increased.

In FIG. 1, the second electrodes 104 are shifted from the second electrets 103 by a distance corresponding to about a half the distance between centers of the first electrodes 102 in a moving direction of the movable substrate 110. The "about a half" means here that the second electrets is not necessarily shifted exactly by a half distance of the distance between centers but the second electrets may be shifted by a distance which is larger or less by about 10% or less of the distance between centers of the first electrodes than a half the distance between centers. For example, in a case where the width of the first electrodes (i.e., size of first electrodes in a direction in parallel with the moving direction of the movable substrate) is 100 μm and the distance between centers of the first electrodes is 200 μm, it is the most preferable to dispose the second electrodes so as to be shifted from the second electrets by 100 μm. However, the positions of the second electrets may have deviation of 10% or less of 100 μm, i.e., deviation of 10 μm or less. For example, in the above described example, the second electrodes are allowed to be disposed so as to be shifted from the second electrets by a distance within a range between 90 μm and 110 μm in the moving direction of the movable substrate. The above described range of deviation means that displacement from a predetermined position (or from a designed position) of the second electrodes is allowable depending on working accuracy upon manufacturing.

The distance by which the second electrodes 104 are shifted from the second electrets 103 is not necessarily limited to a half the distance between centers of the second electrodes. For example, the second electrodes 104 may be shifted from the second electrets 103 by a distance equal to or more than the one fourth of the distance between centers of the second electrodes but a distance less than a half the distance between centers of the second electrodes. Alternatively, the second electrodes 104 may be shifted from the second electrets 103 by a distance larger than about a half distance of the distance between centers of the second electrodes but a distance equal to or less than the three fourth of the distance between centers of the second electrodes. The shifting of the second electrodes 104 from the second electrets 103 allows the movable substrate 110 to start moving (i.e., vibrating) smoothly since an electrostatic force in a direction in parallel with the moving direction of the movable substrate is generated in the area at which the second electrodes 104 do not overlap the second electrets 103.

The power generators 100 and 200 as illustrated in FIGS. 1 and 2 may be configured so as to extract electric power only from either one of the first electrodes 102 or the second electrodes 104, or may be configured so as to extract electric power from both of the first electrodes 102 and the second electrodes 104. Extraction of the electric power from the both of the first electrodes 102 and the second electrodes 104 enables generation of the electric power to be increased. In the power generators 100 and 200 as illustrated in FIGS. 1 and 2, since the electrodes are provided on the upper and lower sides and the respective electrodes face to the electrets, the area of the facing region in which the electrodes and the electrets face to each other can be increased. In other words, with the above described configuration, one power generator can function as if there are two power generators equipped therewith.

As described above, the micro-electro-mechanical power generators 100 and 200 can achieve increase in generation of the electric power and improvement of the reliability thereof, and can provide various types of electrical equipment with the power generators 100 and 200 incorporated therein.

A manufacturing method of the micro-electro-mechanical power generator illustrated in FIG. 1 will be described below.

Figure 3:
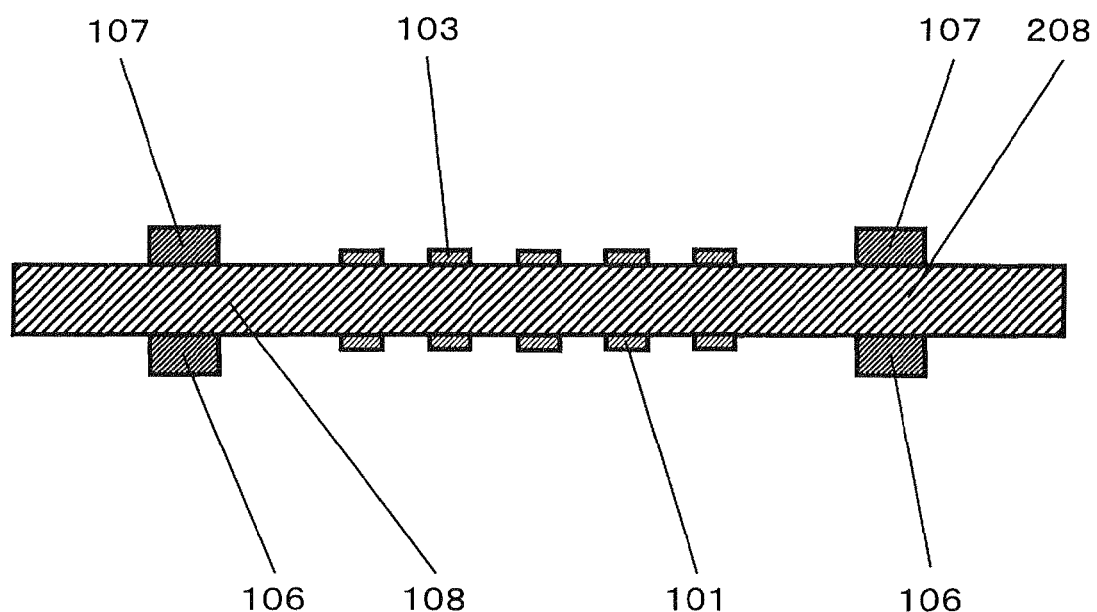
FIG. 3 is a cross sectional view illustrating a manufacturing method of the micro-electro-mechanical power generator in the first embodiment of the present invention.
Figure 3:
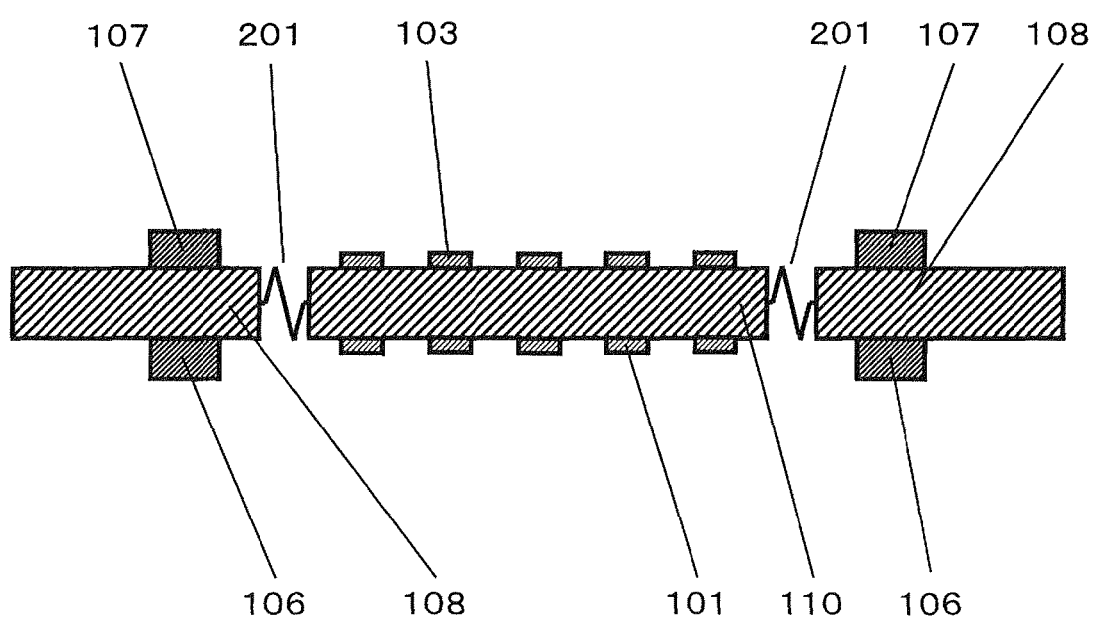
Figure 4:
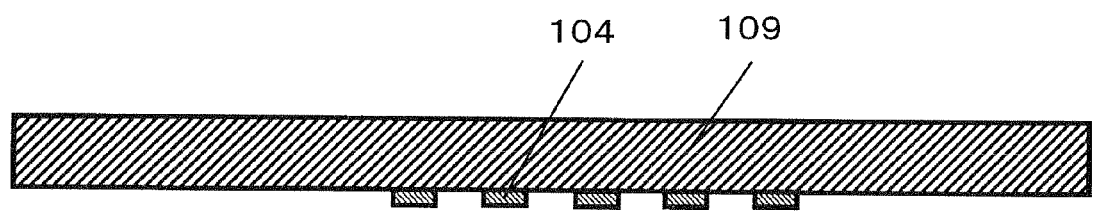
FIG. 4 is a cross sectional view illustrating the manufacturing method of the micro-electro-mechanical power generator in the first embodiment of the present invention.
Figure 4:
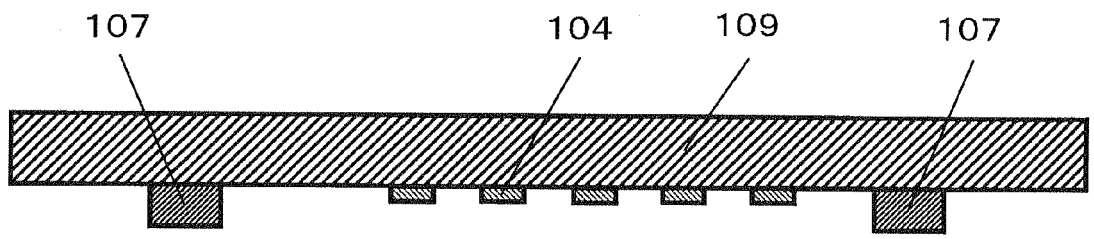
Figure 5:
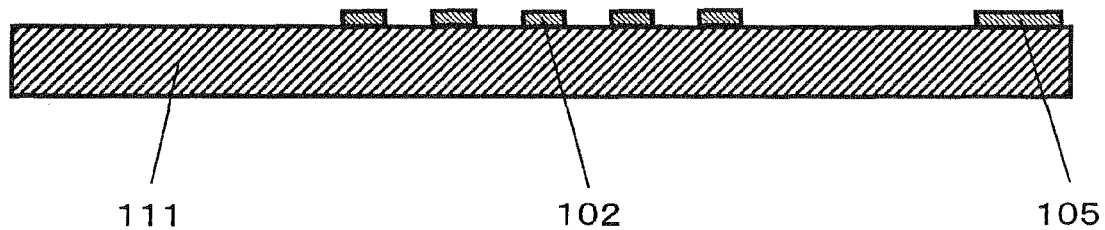
FIG. 5 is a cross sectional view illustrating the manufacturing method of the micro-electro-mechanical power generator in the first embodiment of the present invention.
Figure 5:
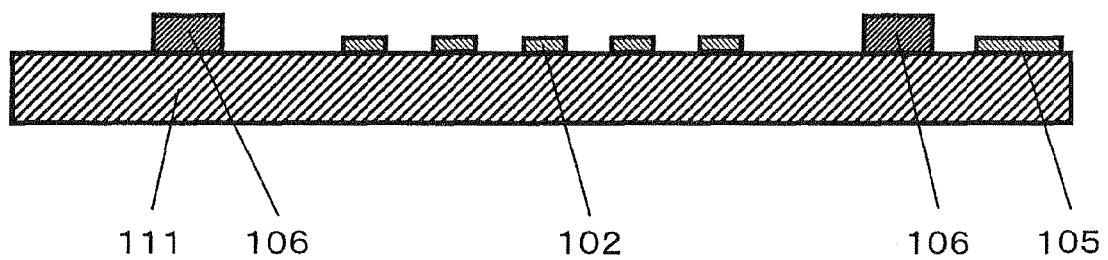

FIGS. 3, 4, and 5 are cross sectional views illustrating the manufacturing method of the micro-electro-mechanical power generator in the first embodiment of the present invention. With reference to FIG. 3, a description will be made on a method for forming the movable substrate 110, the springs 201, and the fixation structures 108 by processing one substrate 208, i.e., a method for forming the middle substrates 108 in which the movable substrate 110 is connected via the elastic structures 201.

FIG. 3(*a*) is a cross sectional view illustrating a state that the substrate 208 is provided with the first electrets 101, the second electrets 103, and junctions 106 and 107 formed thereon. The second electrets 103 are formed such that a material for electrets is deposited on the substrate and then patterned according to a process such as a photolithography process and an etching process. The second electrets 103 are positioned so as to be formed on the movable substrate surface when the springs and the movable substrate are formed according to the following method. Examples of the material for the electrets include an inorganic material such as a silicon oxide film, a silicon nitride film, and a multilayer film thereof, or an organic material. Subsequently, a seed layer (not illustrated) to be used in a plating process is deposited on the substrate to form a pattern by the lithography process, followed by forming the upper junctions 107 by the plating process. Then, the resist (i.e., seed layer) is removed. Examples of the material of the seed layer include titanium, copper, and a multilayer film thereof. An example of the material of the junctions includes copper.

The first electrets 101 are formed on a surface opposite to the surface on which the second electrets 103 are formed. The first electrets are also formed such that the material for the electrets is deposited on the substrate, followed by patterning thereof by, for example, the photolithography process and the etching process. The first electrets 101 are also positioned so as to be formed on the movable substrate surface in the same manner as it is done for the second electrets. Then, the seed layer (not illustrated) to be used in the plating process is deposited on the substrate and then a pattern is formed by the photolithography process, followed by the formation of the lower junctions 106 by the plating process. Subsequently, the resist (i.e., seed layer) is removed.

Subsequently, as illustrated in FIG. 3B, the substrate 208 is processed, by a mask forming process and a Deep Reactive Ion Etching (DRIE) process, into a member having the springs 201, the movable substrate 110, and the fixation structures 108.

How to process the upper substrate 109 will be described below with reference to FIG. 4. FIG. 4(*a*) is a cross sectional view illustrating a state that the surface of the upper substrate 109 is provided with the second electrodes 104 formed thereon. The second electrodes 104 are formed such that the material for the electrodes is deposited on the surface of the upper substrate 109 (i.e., first substrate surface), followed by patterning thereof by, for example, the photolithography process and the etching process. An example of the material of the electrodes includes a metal material such as aluminum, or silicon patterned in the surface of the upper substrate 109 by the etching process.

As illustrated in FIG. 4(*b*), the seed layer (not illustrated) to be used in the plating process is deposited, and a pattern is formed by the photolithography, followed by forming the upper junctions 107 by the plating process. Subsequently, the resist (i.e., seed layer) is removed. Examples of a material of the seed layer include titanium, copper, and a multilayer film thereof. Examples of a material of the junctions include copper, tin, and a multilayer film thereof.

How to process the lower substrate 111 will be described below with reference to FIG. 5. FIG. 5(*a*) is a cross sectional view illustrating a state that the surface of the lower substrate 111 is provided with the first electrodes 102 and the pad 105 formed thereon. The first electrodes 102 and the pad 105 are formed on the surface of the lower substrate 111 (i.e., second surface) by depositing the materials for the electrodes and the pad, with the deposited materials being patterned by, for example, the photolithography process and the etching process. The electrodes and the pad are made of a metal material such as aluminum, or silicon patterned in the surface of the upper substrate 109 by the etching process.

Subsequently, as illustrated in FIG. 5B, the seed layer (not illustrated) to be used in the plating process is deposited, and then a pattern is formed by the photolithography process and the lower junctions 106 are formed by the plating process. Then, the resist (i.e., seed layer) is removed. Examples of the material for the seed layer include titanium, copper, and a multilayer film thereof. Examples of the material of the junctions include copper, tin, and a multilayer film thereof.

Figure 6:
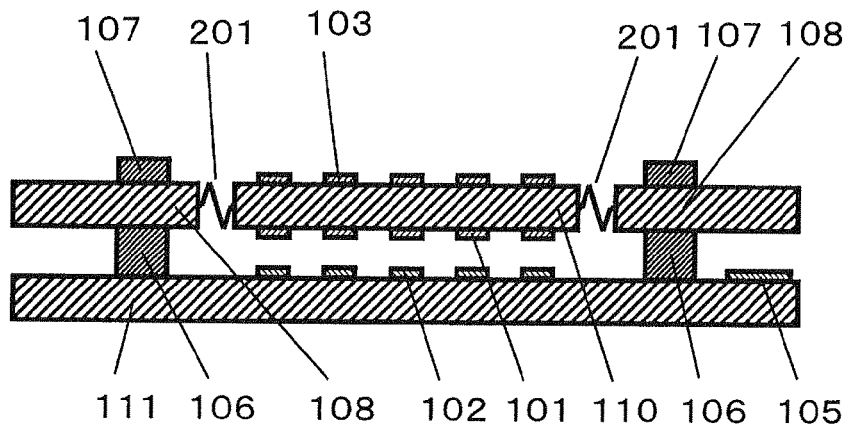
FIG. 6 is a cross sectional view illustrating the manufacturing method of the micro-electro-mechanical power generator in the first embodiment of the present invention.
Figure 6:
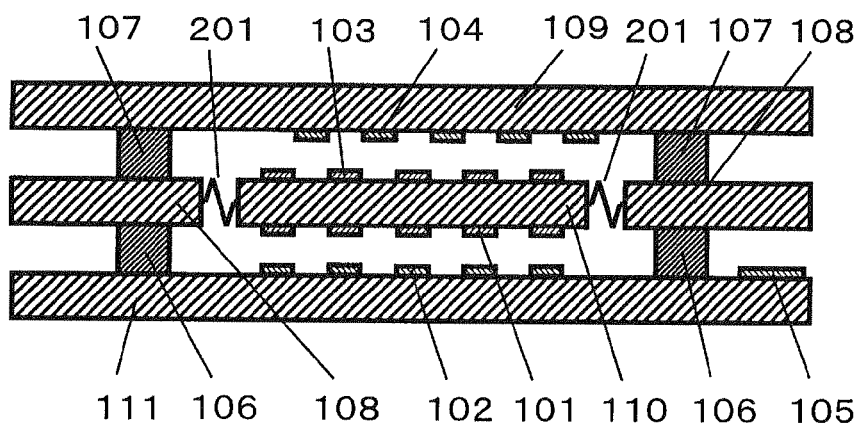
Figure 6:
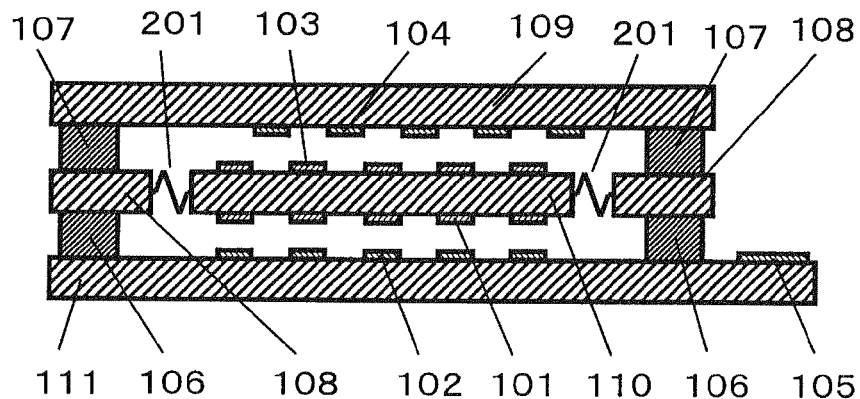

An assembling process of the movable substrate 110, the springs 201 and the fixation structures 108 which are formed by processing one single substrate, the upper substrate 109, and the lower substrate 111 will be described below with reference to FIG. 6. As illustrated in FIG. 6(*a*), the lower substrate 111 is joined with the fixation structures 108 by joining the lower junctions 106 after the electrically charging process is performed for the first electrets 101 formed on the surface of the movable substrate 110. Now, the electrically charging process is performed for the second electrets 103 formed on the surface of the movable substrate 110. Subsequently, as illustrated in FIG. 6(*b*), the upper junctions 107 are joined to the upper junctions 107 corresponding thereto.

FIG. 6(*c*) illustrates a process in which the upper substrate 109, the fixation structures 108, and the lower substrate 111 are processed to expose the pad 105 by grinding or DRIE, followed by chipping (i.e., fragmenting) of the power generator.

According to the above described manufacturing method, the micro-electro-mechanical power generators 100 and 200 capable of giving the above described effects can be realized.

Figure 7:
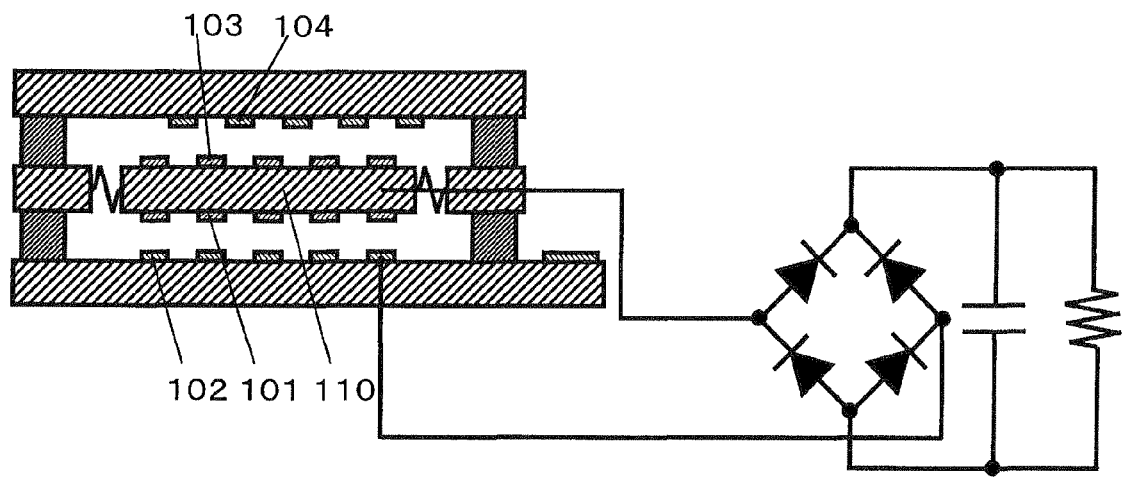
FIG. 7 is a circuit diagram illustrating a configuration of the micro-electro-mechanical power generator in the first embodiment of the present invention.
Figure 8:
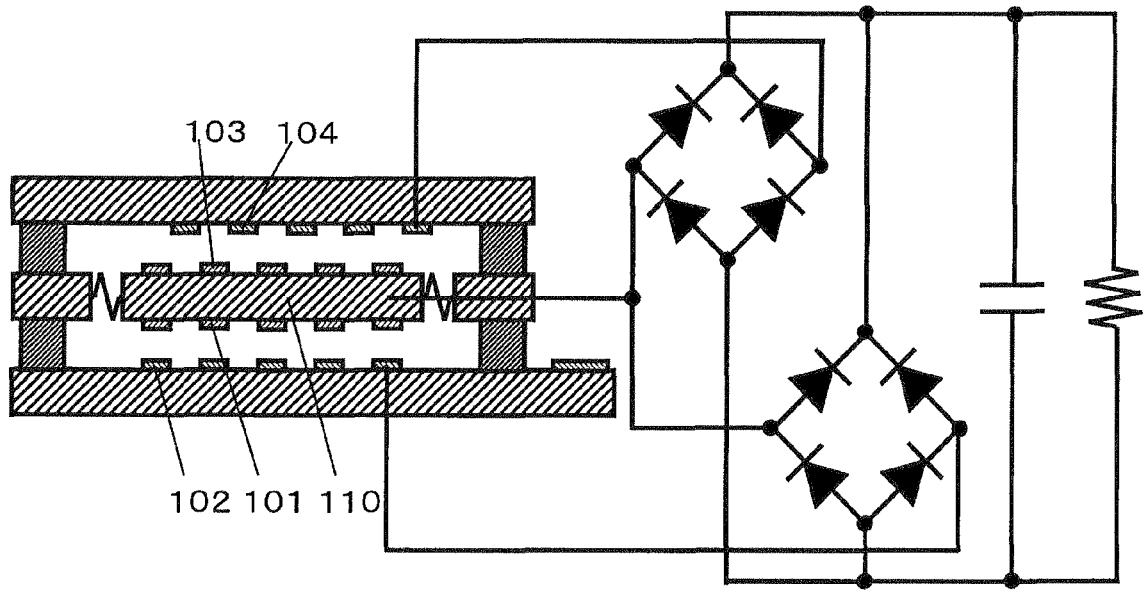
FIG. 8 is a circuit diagram illustrating another configuration of the micro-electro-mechanical power generator in the first embodiment of the present invention.

FIGS. 7 and 8 are circuit diagrams illustrating a circuit configured by using the micro-electro-mechanical power generator in the first embodiment of the present invention.

FIG. 7 illustrates a circuit configuration which outputs electric power from the first electrodes 102. The circuit is a power supply circuit which converts an alternating-current (AC) signal output by repetition of the supply and discharge of electric power in the first electrodes 102, into a direct-current (DC) signal. The power supply circuit is connected between the first electrodes 102 and the movable substrate 110. For example, the power supply circuit may comprise a bridge rectifier circuit comprising four diodes, a smoothing circuit comprising a capacitor, and a load resistance.

FIG. 8 illustrates a circuit configuration for outputting electric power from the first electrodes 102 and the second electrodes 104. The power supply circuit is connected between the first electrodes 102 and the movable substrate 110 and between the second electrodes 104 and the movable substrate 110, respectively. As it is illustrated, for example, the power supply circuit is equipped with two bridge rectifier circuits and includes one smoothing circuit and one load resistance in order to rectify the electric power output from each of the first electrodes 102 and the second electrodes 104.

Second Embodiment

Figure 9:
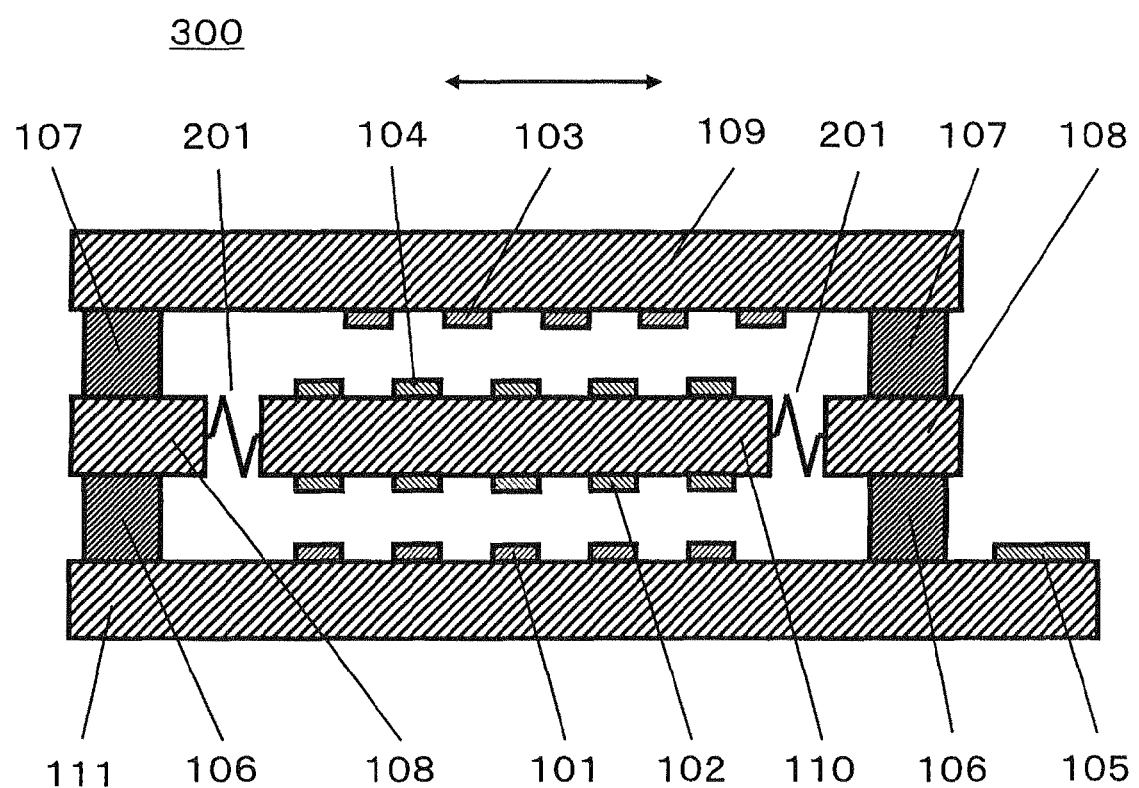
FIG. 9 is a cross sectional view illustrating a configuration of a micro-electro-mechanical power generator in a second embodiment of the present invention.

FIG. 9 is a cross sectional view illustrating a configuration of a micro-electro-mechanical power generator in the second embodiment of the present invention.

In a micro-electro-mechanical power generator 300 of a second embodiment, the first electrets 101 are formed on the surface of the lower substrate 111 (i.e., first substrate surface); the first electrodes 102 are formed on the surface of the two surfaces of the movable substrate 100, the surface facing to the first substrate surface; the second electrets 103 are formed on the surface of the upper substrate 109 (i.e., second substrate surface); and the second electrodes 104 are formed on the surface of two surfaces of the movable substrate 110, the surface facing to the second substrate surface. The power generator 300 differs from the power generator 100 of the first embodiment in that both of the first electrodes 102 and the second electrodes 104 are formed on the movable substrate 110 and the first electrets 101 and the second electrets 103 are formed, respectively, on the lower substrate 111 and the upper substrate 109. In the embodiment illustrated in FIG. 9, the first electrets 101, the first electrodes 102, and the second electrodes 104 are aligned with each other when viewed in a direction vertical to the first substrate surface.

In the power generator 300, the second electrets 103 are disposed so as to be shifted from the second electrodes 104 by about a half the distance between centers of the first electrodes 102 in the moving direction of the movable substrate 110. The effect thereof has been described above in conjunction with the first embodiment. In a case where the second electrets are disposed so as to be shifted from the second electrodes by a predetermined distance in the moving direction of the movable substrate, a preferable predetermined distance is as described above in conjunction with the first embodiment.

With the above described configuration, the electrically charging process can be performed, respectively, for the electrets on the lower substrate 111 and the electrets on the upper substrate 109, resulting in simplification of the manufacturing process.

With the micro-electro-mechanical power generator 300, an effect of simplifying the manufacturing process as well as the effects having been described above in conjunction with the first embodiment (i.e., increase in generation of the electric power and improvement of the reliability) can be given.

Third Embodiment

Figure 10:
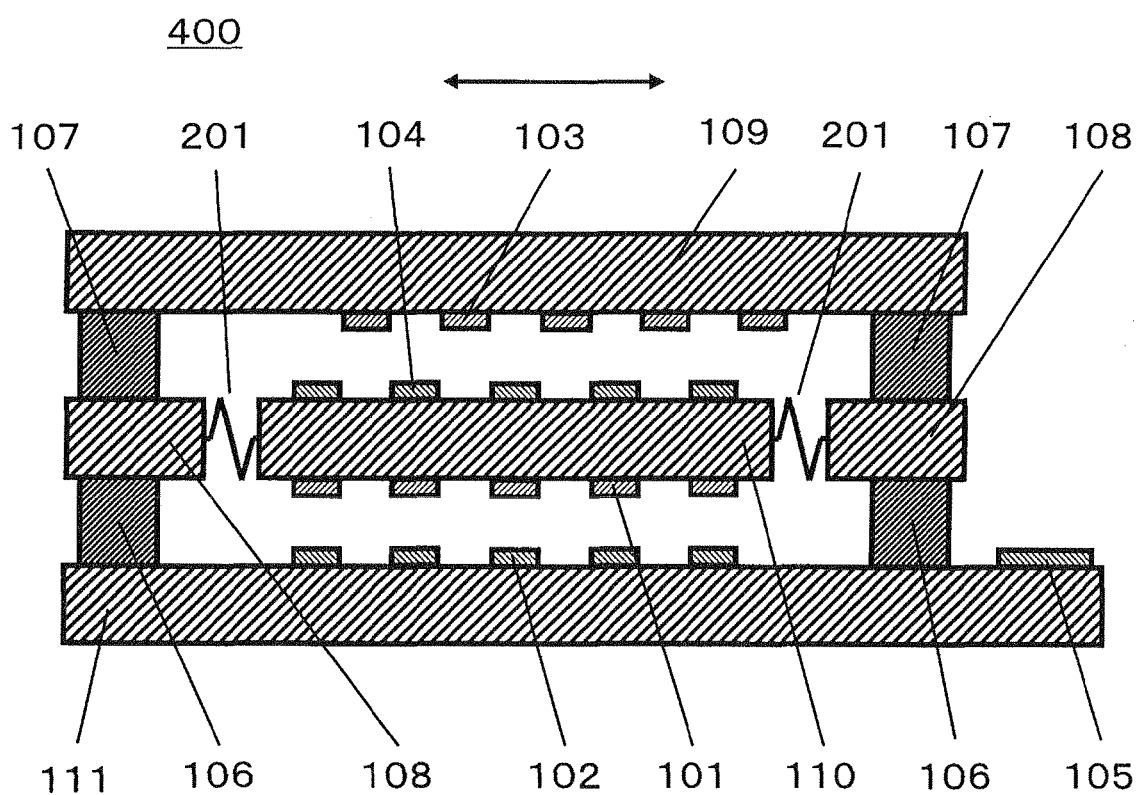
FIG. 10 is a cross sectional view illustrating a configuration of a micro-electro-mechanical power generator in a third embodiment of the present invention.
Figure 11:
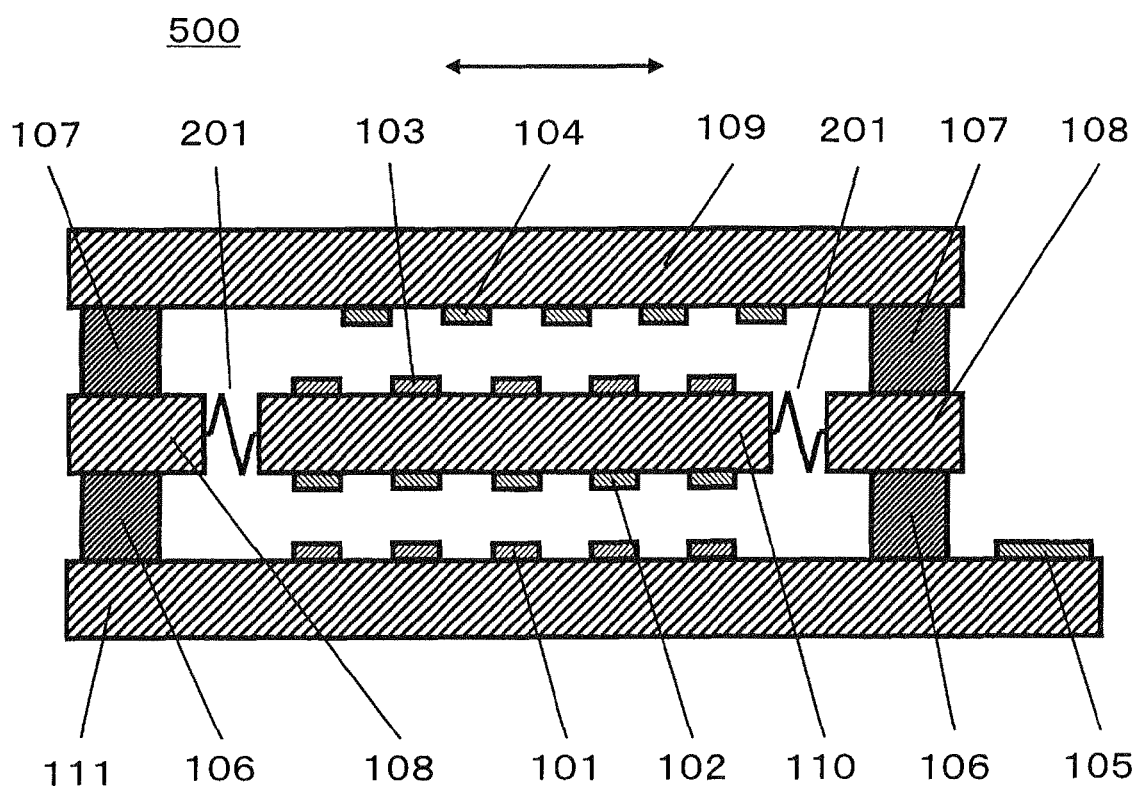
FIG. 11 is a cross sectional view illustrating another configuration of the micro-electro-mechanical power generator in the third embodiment of the present invention.

FIGS. 10 and 11 are cross sectional views illustrating a configuration of a micro-electro-mechanical power generator in a third embodiment of the present invention.

In a micro-electro-mechanical power generator 400, the first electrodes 102 are formed on the surface of the lower substrate 111 (i.e., first substrate surface); the first electrets 101 are formed on the surface of the two surfaces of the movable substrate 110, the surface facing to the first substrate surface; the second electrets 103 are formed on the surface of the upper substrate 109 (i.e., second substrate surface); and the second electrodes 104 are formed on the surface of the two surfaces of the movable substrate 110, the surface facing to the second substrate surface. The power generator 400 differs from the power generator of the first embodiment in that the second electrets 103 are formed on the surface of the upper substrate 109 and the second electrodes 104 are formed on one surface of the movable substrate. Therefore, in the power generator 400 illustrated in FIG. 10, the first electrodes 102, the first electrets 101, and the second electrodes 103 are aligned with each other when viewed in a direction vertical to the first substrate surface.

In the power generator 400, the second electrets 103 are disposed so as to be shifted from the second electrodes 104 by about a half the distance between centers of the first electrodes 102 in the moving direction of the movable substrate 110, similarly to the power generator of the second embodiment. An effect given by the above configuration is as described above in conjunction with the first embodiment. In also a case where the second electrets are disposed so as to be shifted from the second electrodes by a predetermined distance in the moving direction of the movable substrate, the preferable predetermined distance is as described above in conjunction with the first embodiment.

In a micro-electro-mechanical power generator 500, the first electrodes 102 are formed on the surface of the two surfaces of the movable substrate 110, the surface facing to the first substrate surface; the second electrodes 104 are formed on the surface of the upper substrate 109 (i.e., first substrate surface); the first electrets 101 are formed on the surface of the lower substrate 111 (i.e., first substrate surface); and the second electrets 103 are formed on the surface of the two surfaces of the movable substrate 110, the surface facing to the second substrate surface. The power generator 500 differs from the power generator of the first embodiment in that the first electrets 103 are formed on the surface of the lower substrate 111 and the first electrodes 102 are formed on one surface of the movable substrate.

Both of the embodiments illustrated in FIGS. 10 and 11 have such a configuration that the electrets are formed on one of the two surfaces of the movable substrate 110 and the electrodes are formed on the other one of the two surfaces of the movable substrate 110.

With the above described configuration, the electrically charging process for the electrets formed on the movable substrate 110 and the electrically charging process for the electrets formed on the upper substrate 109 or the lower substrate 111 can be performed independently. As a result thereof, the manufacturing process can be more simplified.

The micro-electro-mechanical power generators 400 and 500 can give an effect of simplifying the manufacturing process as well as the effects as described above in conjunction with the first embodiment (i.e., increase in generation of the electric power and improvement of the reliability).

All the embodiments are described above provided that the lower substrate is the first substrate and the upper substrate is the second substrate. The power generators of the above described embodiments can be used, as a matter of course, in a state of, for example, up-side-down. The pad 105 may be provided on the upper substrate 109. Alternatively, in another embodiment, the lower substrate may be the second substrate and the upper substrate may be the first substrate. The technical terminologies such as "the first" and "the second" are used just for discriminating between the two substrates and are not used for showing an up-and-down positional relationship of the substrates.

In the above described embodiments, the movable substrate is supported by the fixation structures in such a manner that the movable substrate is connected to the fixation structures via the elastic structures. The movable substrate may be supported by the fixation substrate by, for example, a magnetic force or an electrostatic force as far as the movable substrate can reciprocate in a predetermined direction. For example, in a case where the movable substrate is supported by the electrostatic force, the first substrate and the second substrate can also serve as the fixation structures. In this case, for example, the movable substrate can be supported by the electrostatic force (i.e., repulsion) between the electrets provided on each of the second substrate and the movable substrate.

In the above described embodiment, the moving direction of the movable substrate is in parallel with one side of a rectangular shape or a square shape when the first substrate and the second substrate are formed into the rectangular shape or the square shape as illustrated in FIG. 14. However, the descriptions of these embodiments would not prohibit the moving direction of the movable substrate from being another direction instead of or in addition to this moving direction in the power generator of the present invention.

INDUSTRIAL APPLICABILITY

The micro-electro-mechanical power generator according to the present invention can achieve the increase in the generation of the electric power and the improvement of reliability thereof, and thus is useful as a power supply for various electrical equipment.

DESCRIPTION OF REFERENCE NUMERALS

100, 200, 300, 1000: Micro-electro-mechanical power generator
101: First electrets
102: First electrodes
103: Second electrets
104: Second electrodes
105: Pad
106: Lower junction
107: Upper junction
108: Fixation structure
109: Upper substrate
110: Movable substrate
111: Lower substrate
201: Elastic structure (Spring)
208: Substrate

The invention claimed is:

1. A micro-electro-mechanical power generator comprising:
    a first substrate having a first substrate surface;
    a second substrate having a second substrate surface;
    a movable substrate which is movable; and
    fixation structures for supporting the movable substrate,
    wherein the first substrate surface and the second substrate surface are opposed to each other,
    wherein the movable substrate is disposed between the first substrate and the second substrate and movable in at least one axis direction that is in parallel with the first substrate surface,
    wherein a plurality of first electrets are disposed on one of (i) the first substrate surface, which faces the moveable substrate and (ii) a first surface of the movable substrate, the first surface of the movable substrate facing the first substrate surface,
    wherein a plurality of first electrodes are disposed on the other one of (i) the first substrate surface and (ii) the first surface of the movable substrate,
    wherein a plurality of second electrets are disposed on one of (i) the second substrate surface, which faces the moveable substrate and (ii) a second surface of the movable substrate, the second surface of the movable substrate facing the second substrate surface,
    wherein a plurality of second electrodes are disposed on the other one of (i) the second substrate surface and (ii) the second surface of the movable substrate,
    wherein the first electrets, the first electrodes, the second electrets, and the second electrodes line up in a direction in parallel with the moving direction of the movable substrate;
    wherein the first electrets are disposed such that the first electrets are parallel with each other and distances between centers of two adjacent first electrets are equal to each other,
    wherein the first electrodes are disposed such that the first electrodes are parallel with each other and distances between centers of two adjacent first electrodes are equal to each other,
    wherein the second electrets are disposed such that the second electrets are parallel with each other and distances between centers of two adjacent second electrets are equal to each other,
    wherein the second electrodes are disposed such that the second electrodes are parallel with each other and distances between centers of two adjacent electrodes are equal to each other,
    wherein the distances between centers of the two adjacent first electrets, the distances between centers of the two adjacent first electrodes, the distances between centers of the two adjacent second electrets, and the distances between centers of the two adjacent second electrodes are equal to each other,
    wherein the first electrets, the first electrodes, the second electrets and the second electrodes are disposed such that when positions of the first electrets align with positions of the first electrodes when viewed in a direction vertical to the first substrate surface, positions of the second electrets are shifted from positions of the second electrodes by about a half the distance between centers of the two adjacent first electrodes in the moving direction of the movable substrate, and
    wherein the first electrets, the first electrodes, the second electrets and the second electrodes are disposed such that when an overlapped area between the first electrodes and the first electrets is largest, the second electrodes and the second electrets do not overlap when viewed in a direction vertical to the first substrate surface, and
    wherein no additional electret is disposed between the two adjacent first electrets, no additional electrode is disposed between the two adjacent first electrodes, no additional electret is disposed between the two adjacent second electrets, and no additional electrode is disposed between the two adjacent second electrodes.

2. The micro-electro-mechanical power generator according to claim 1, wherein the movable substrate is connected to the fixation structures via elastic structures, respectively.

3. The micro-electro-mechanical power generator according to claim 1, wherein the first electrets and the second electrets are disposed, respectively, on surfaces of two different substrates which are selected from the first substrate, the movable substrate and the second substrate.

4. The micro-electro-mechanical power generator according to claim 1, which generates power by current which flows in the first electrode and the second electrode.

5. An electric apparatus which comprises the micro-electro-mechanical power generator according to claim 1.

* * * * *